June 21, 1966  C. KARRAS  3,256,857
PRODUCT AND METHOD FOR MAKING ANIMAL BEDDING
Filed Sept. 24, 1965
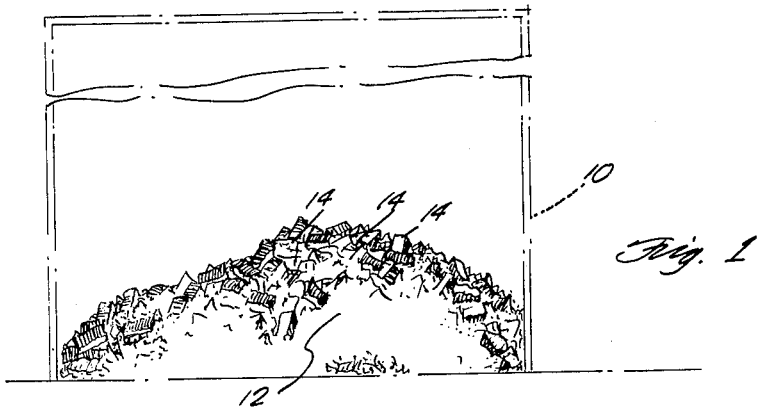
Fig. 1
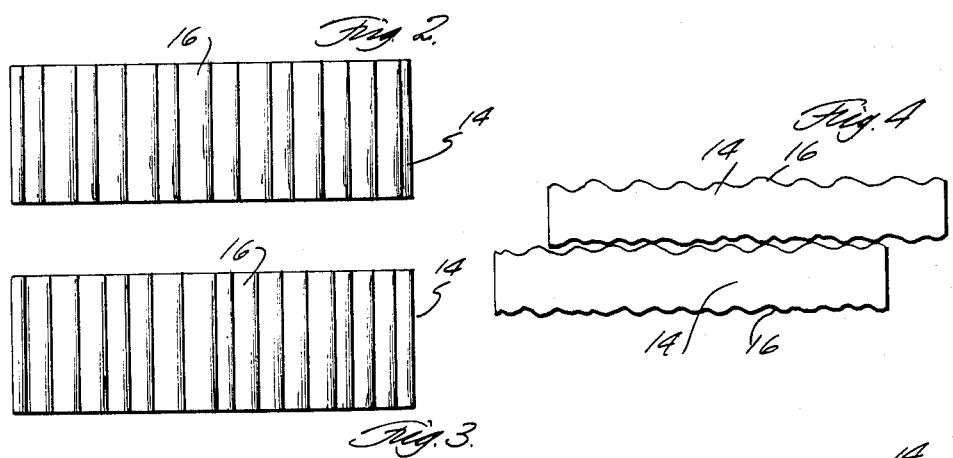
Fig. 2
Fig. 3
Fig. 4
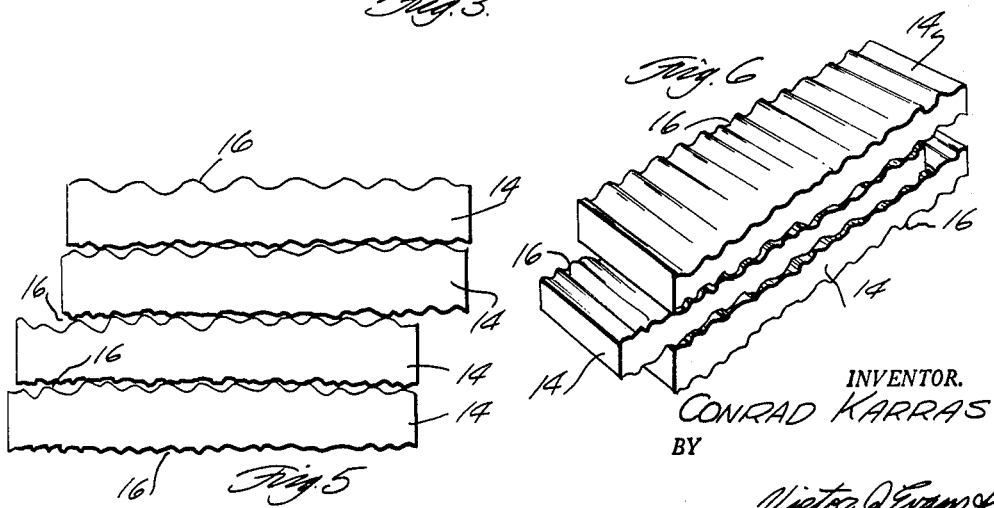
Fig. 5
Fig. 6
INVENTOR.
CONRAD KARRAS
BY
Victor J. Evans & Co.
ATTORNEYS United States Patent Office 3,256,857
Patented June 21, 1966

3,256,857
PRODUCT AND METHOD FOR MAKING
ANIMAL BEDDING
Conrad Karras, 635 Midland Ave., Garfield, N.J.
Filed Sept. 24, 1965, Ser. No. 489,889
8 Claims. (Cl. 119—1)

The present invention relates to an improved product and process for making animal bedding material, and more particularly relates to an animal bedding material formed from prism-shaped wood components that are processed for particular adaptation to laboratory animals and particular to the exclusion of poultry and this application is a continuation-in-part of the Karras application, Serial No. 366,181, filed May 8, 1964, for Process and Method, presently pending before the U.S. Patent Office.

Various materials have been previously used for animal bedding, and some of these materials are found objectionable for laboratory animals since some of the materials are found to be edible, not capable of incineration, not suitable for disposal via drains and sewer lines, or the materials become unduly matted, and some materials are found to be chemically processed or have inherent chemical or physico-chemical qualities that are quite injurious to animals, particularly animals that are new-born.

An ideal animal bedding for laboratories may be considered as (1) highly absorbent of excreta, but not too absorbent as to be deliquescent, particularly to the skin of new-born and very young animals;
(2) non-edible or at least repugnant to oral intake, even if edible in the broad sense of the word;
(3) non-toxic or not harmful in experimental terms, i.e., not detrimental to results of investigations;
(4) abundant and readily available at all times rather than seasonally;
(5) economical in acquisition and use;
(6) a product of relatively or absolutely uniform nature;
(7) free of vermin, particles and harmful microbial life;
(8) easily disposable by various conventional means; and
(9) protectively packaged.

It is within the scope of the present invention that the particle shape and the process for making the particle shape of the animal bedding components is such that they do not contain sharp corners which are found to injure animals, but in the present case the particles are quite small so that it is possible for small animals, including new-born animals, to allow the particles to turn over as the animal moves about, and in so doing new surfaces of such particles are thereby exposed to provide greater use of the animal bedding and, in effect, this is seen equated to the addition of or substitution of additional exposure of bedding to the laboratory animal without the usual deleterious effects that otherwise result. The particles are contoured and used as an underbedding, and the contour provides optimum exposure of the surfaces even without turn-over of the particles by the animals' action.

A further contemplation of the present invention is that the particles are each treated so that there is greater removal of moisture from the wood product forming the animal bedding due to higher temperatures employed in treating, shaping, and sizing of the particles, and thereby preventing the matting of the particles together, and also preventing the clogging of the particles as they may be caused to be washed down a water drain, or the like.

A further feature of the invention is that the particles forming the animal bedding are a cut-product instead of a pulverized compressed product of sawdust or the like, and thus have the attending advantages of the invention.

A further advantage is that woods are employed that have various fibrous values, but oak and pine and similar woods containing tannic acid or objectionable resin are particularly not used since they contain tannic acid or a resin, respectively, that is found objectionable for use with laboratory animals.

Another feature of the present invention is that the particles by having been prepared by the process and method of the present invention are found not to mat when they become saturated with water or urine which would tend to mat the particles of prior art devices when they are washed down a waste drain.

A further feature of the present invention is that the particles forming the animal bedding are non-toxic because fungus growth is retarded.

In accordance with the present invention, there are provided small wood particles of substantially uniform and generally prism-shape and size, the particles being pathogen free by heat treatment in which the particles result in a size of generally $\frac{1}{10}$ x $\frac{1}{10}$ x $\frac{3}{10}$ inches in length, or even more desirably a size of $\frac{1}{10}$ x $\frac{1}{20}$ x $\frac{3}{10}$ inches, or even an equal mixture of each of these sizes, and in which the woods are selected from a group of hardwoods including beech, birch and maple, and processed to be essentially dust and chemically toxic-free and heat treated to be adapted for absorbing and retaining a high degree of moisture, and the particles resist matting by means of having each of the surfaces along the largest surface of the particles constructed to be serrated for increasing the residual surface area thereof and allowing the particles to be turned about to expose the opposite surfaces as the animal moves about.

The particles of the invention are evenly distributed throughout a cage or other receptacle for laboratory animals, and the upper layer of particles tends to become displaced and overturned upon the activity of the animal due to the elongated, small sized particles forming the animal bedding and thereby increase the utility of the bedding for a longer time and prevent the bedding from becoming matted in any way. The particles are heated in the manufacturing process for drying and sterilizing the particles by means of a flue gas, for example, which is preferably heated at a temperature of about 750° to 800° F. so as to insure complete sterilization and demoisturizing of the finished particles.

A hammer mill may be used to disintegrate the large pieces as well as to form the small pieces of the particles, and a separation process is used to clean out and eliminate the large particles as well as the dust and small splintered products.

Accordingly, the primary object of the present invention is to provide an animal bedding that overcomes all of the above objections in that the wood particles are capable of incineration, not edible, not chemically treated, and will not mat. In addition, the wood particles are free of grossly harmful pathogen and actually absorb odors as well as any liquids and animal excretions which may come into contact therewith.

Another object of this invention is to provide an animal bedding comprising selected hardwood particles that are completely aspirated or subject to being breathed without harm to laboratory animals, odor absorbing, capable of incineration, not attractive to animal feeding, and compatible to and specifically formulated for laboratory research animals such as mice, rats, guinea pigs, hamsters, and the like.

A further object of this invention is to provide a novel method for making an animal bedding of the aforementioned type.

The above and other objects and advantages of the invention will become apparent upon full consideration of the following detailed description and accompanying drawings in which:

FIG. 1 is a cross-sectional view shown in part of the animal bedding as it may be used in an animal cage for laboratory animals. illustrated in dotted line, in the use of the invention in its preferred form;

FIG. 2 shows a plane, cross-sectional view of one of the particles of wood forming the animal bedding;

FIG. 3 shows a plane elevation view of a similar type particle in which the surface of the particle is shown having a serrated surface; and FIGS. 4, 5 and 6 show the manner in which a plurality of such particles may be assembled as shown collectively for use as animal bedding for laboratory animals.

Referring now to the drawings, there is shown in FIG. 1 an animal cage 10 in which may be provided an accumulation 12 of substantially small wood particles 14, 14, 14 of substantially uniform prism shape and size, said sizes being generally $\frac{1}{10} \times \frac{1}{10}$ or $\frac{1}{20} \times \frac{3}{10}$, and adapted to be sifted through a size 8 mesh screen and retained by a size 16 mesh screen.

The particles 14 are constructed to have a uniform size, shape and texture, and are selected from a group of hardwoods including beech, birch and maple. These woods are free of excessive amounts of tannic acid and resins. The lengths of the particles are selected since they are found by experimentation to be particularly adapted to be turned over as a laboratory animal moves about. As the particles are turned over, a new litter surface is presented so that the absorption characteristic of the litter is increased.

The particles are seen to have a serrated surface 16, 16 for increasing substantially the surface area of each of the wood particles 14, 14, and thereby increase their ability to absorb. The wood particles having been treated to a temperature range of about 800° F. reduces the moisture content thereof to essentially 4% making the bedding extremely porous to absorb odors and the wood particles swell as waste is absorbed. The shape and size of the particles are important since the particles lack sharp points which would otherwise injure the animals including the new-born animals such as mice which are generally only one inch in length. Also the size of the particles is important since the particles of the present invention will not clog the water bottles used by the animals. If larger particles are used, laboratory animals will not turn them over as they walk over them, and such lack of turning capability results in matting of the particles. Thus the turning capability tends to resist matting of the particles. The size and shape of the particles of the present invention particularly adapt the particles to be turned over by the animals as they move about for exposing new absorbent surfaces of the wood particles for their absorption and retention of moisture and odors as well as resisting matting. It is further seen that the particular size lends to the quasi ability of the particles to provide an abrasive cleansing effect on the fur of the animals. Thus the particles are particularly useful for rodents and similar type laboratory animals.

The serrated edges of the particles are produced by the cutting of the wood.

The particles are heat-treated to essentially 800° F. prior to their use to achieve the condition of being pathogen-free and are sifted through a size 8 mesh screen and retained on a size 16 mesh screen. Thus the animal bedding 12 is essentially dust-free and it may be air-washed or aspirated to present no inhalation hazards, since there is no particle which is less than 10 microns in size.

In accordance with one aspect of the invention, the wood particles may be cleaned by a subsequent heat treatment after they have been excessively used in laboratory cages, and by recycling the particles through the heat treatment and air washing or aspiration cycle, they may be in some instances reused.

In carrying out the objects of the present invention, I employ raw material of selected hardwood such as beech, birch or maple and comminute this in any conventional manner to form small wood particles, actually prisms of wood, which are heat treated in a rotary kiln or oven either with direct flame or steam. The wood particles are sifted through a screen assembly. The purpose of heat treating is to destroy grossly harmful pathogen or any micro-organism or virus that can cause diseases, and this is significant when used with laboratory animals. Due to the heat treatment and screening, the material is substantially dust-free and highly absorptive and retentive to animal waste and will not mat when wet, such as occurs when using wood shavings or sawdust.

The hardwood particles may be mixed together, if desired, in any proportions and the particles may be formed by using saws or the like for forming sawdust-like particles and dust may be readily removed by using air aspiration of the wood particles, and the material is capable of incineration when desired. While the term "wood particles" has been used to define the wood prism shapes, it is not necessary that the miniscule wood particles be completely square or rectangular since they may be generally or substantially rectangular or other related shapes and work just as well as long as they are generally prismatic and are heat treated and passed through the screen mesh.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. An animal bedding comprising small wood particles of substantially prismatic uniform shape and size, essentially $\frac{1}{10} \times \frac{1}{20} \times \frac{3}{10}$ inches and $\frac{1}{10} \times \frac{1}{20} \times \frac{3}{20}$ inches, said particles being heat treated and pathogen free, said uniform size of the particles being essentially between size 8 and size 16 mesh screen, said particles being substantially highly absorptive and retentive of odors and liquid as applied thereto, and said particles being selected from a group of hardwoods consisting essentially of beech, birch and maple, and said particles being essentially dust free.

2. The animal bedding of claim 1 wherein one pair of the larger faces of the prismatic particles is essentially serrated throughout its faces.

3. An animal bedding comprising small wood particles of substantially uniform thin prism shape and size, said particles being pathogen free by heat treatment and having their two large faces serrated to effectively increase the surface area of the respective faces.

4. The structure as defined in claim 3 wherein said wood particles are heat treated to achieve the condition of being pathogen free and are sifted through a size 8 mesh screen and retained on a size 16 mesh screen.

5. The structure as defined in claim 4 wherein said wood particles are highly absorptive and retentive of odors and liquid.

6. The structure as defined in claim 5 wherein said wood particles are selected from a group of hardwoods consisting essentially of beech, birch and maple.

7. The structure as defined in claim 6 wherein said wood particles are substantially dust and chemical free.

8. The method of making an animal bedding consisting essentially of the steps of comminuting hardwood selected from the group consisting essentially of beech, birch and maple, into substantially generally rectangular faced particles and in which a pair of its larger faces is serrated throughout, heat treating the hardwood particles to 800° F. to remove pathogen therefrom, and sifting the heat-treated particles for selecting substantially the same size particles and removing dust therefrom.

References Cited by the Examiner

UNITED STATES PATENTS

| | | | |
|---|---|---|---|
| 1,967,333 | 7/1934 | Smith | 119—1 |
| 2,179,591 | 11/1939 | Godchaux | 119—1 |
| 2,279,405 | 4/1942 | Laughlin | 119—1 |
| 2,376,672 | 5/1945 | Dreyling | 119—1 |
| 2,708,418 | 5/1955 | Sugarman et al. | 119—1 |
| 3,029,783 | 4/1962 | Sawyer et al. | 119—1 |

SAMUEL KOREN, *Primary Examiner.*

ALDRICH F. MEDBERY, *Examiner.*